Figures 1, 2, 3:
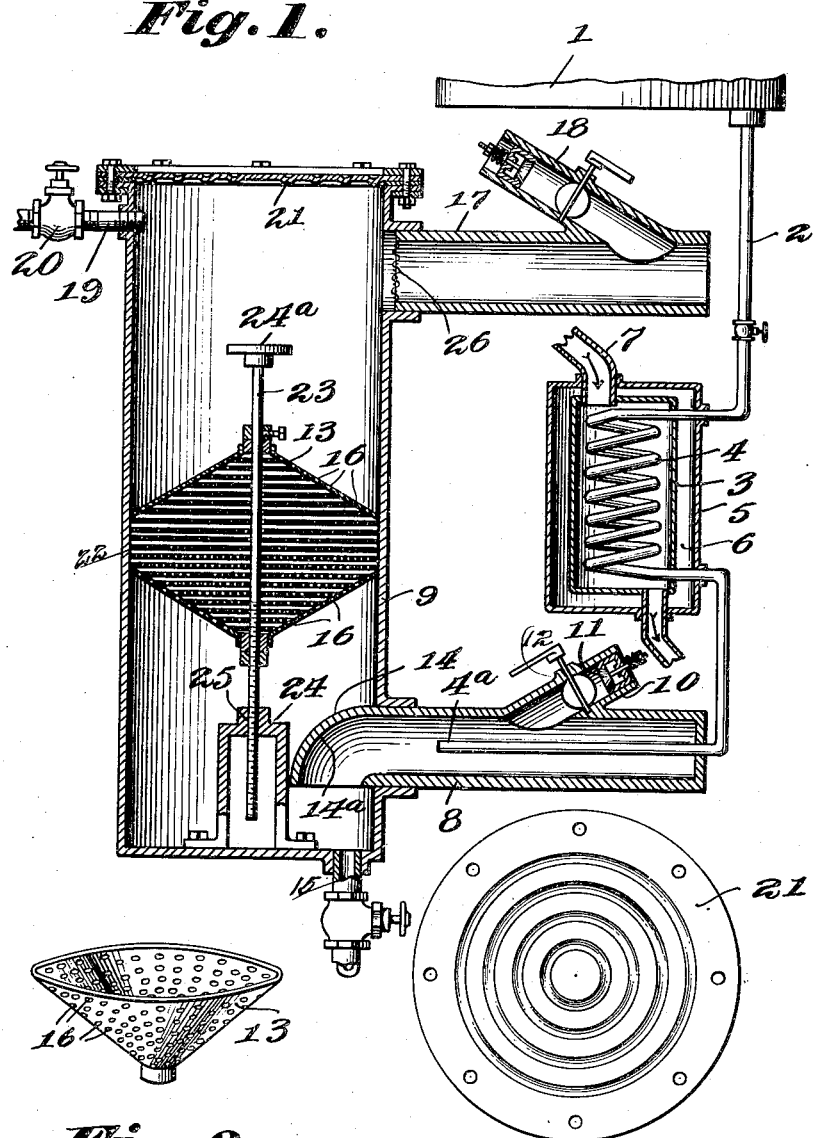

C. V. STUART.
APPARATUS FOR CARBURETING AIR.
APPLICATION FILED JAN. 15, 1914.

1,102,702.

Patented July 7, 1914.

Witnesses
H. H. Lybrand
M. K. Freeman

Inventor
Charles Vivion Stuart,
By
Attorney

UNITED STATES PATENT OFFICE.

CHARLES VIVION STUART, OF MEMPHIS, TENNESSEE.

APPARATUS FOR CARBURETING AIR.

1,102,702.

Specification of Letters Patent.     Patented July 7, 1914.

Application filed January 15, 1914. Serial No. 812,277.

*To all whom it may concern:*

Be it known that I, CHARLES VIVION STUART, a citizen of the United States of America, residing at Memphis, in the county of Shelby and State of Tennessee, have invented certain new and useful Improvements in Apparatus for Carbureting Air, of which the following is a specification.

This invention relates to an apparatus for carbureting air and has for its object the provision of a device of the character specified wherein carbureted air suitable for illuminating, heating or power purposes may be generated directly from crude oil or derivatives of crude oil in a simple and efficient manner; the provision of an apparatus wherein the vapor (or carbureted air) produced has the properties of rapid ignition, or rapid flame propagation and this without the undesirable soot or carbon residuum ordinarily incident to the use of crude oil.

The apparatus is especially adapted to carry out the process described and claimed in my copending application Serial No. 788,718, filed September 8, 1913.

Certain embodiments of the apparatus are illustrated in the accompanying drawings.

Briefly stated, the process practised by this apparatus consists in the steps of first vaporizing the crude oil by the application of heat, and subsequently mixing air with the crude oil vapor; passing the resultant mixture upwardly through a filtering medium, whereby a more intimate mixture is obtained, and whereby any of the heavier and unvolatilized suspended ingredients of the vapor may be extracted. In some cases I have found it desirable to add the air to the vapor after it has passed the filtering medium, and in still further instances it has been found that better results will take place by the addition of air both before and after the mixture has been subjected to the filtering medium.

I am aware that, prior to my invention, certain laboratory work has included the carbureting of air with crude oil vapor in an experimental way. The explosive mixture obtained however, has always been of such a nature as to render it useless from a commercial standpoint, due to the presence of too large a proportion of unvolatilized ingredients. It is my belief that prior to my invention, the presence of suspended ingredients in large quantities, has been due to the omission of a very material and vital step in the carbureting process. In the practice of my invention, the crude oil is vaporized in the absence of air, by the application of heat. I then mix the air and crude oil vapor, as hereinafter explained, and pass the mixture at a relatively high velocity into a large filtering or settling chamber in which the mixture is caused to abruptly rise in a vertical direction with a reduced velocity. In this process gravity causes the heavy unvolatilized globules of oil to fall to the bottom of the chamber, while the lighter particles pass through the filtering medium, as will be more particularly pointed out.

Referring to the embodiment of my invention as shown in the drawings forming a part thereof: Figure 1 is a view of my device in sectional elevation. Fig. 2 is a perspective view of one of the conical disks included in the filtering medium. Fig. 3 is a plan view of the flexible diaphragm which closes the top of the tank or container.

In the drawings 1 indicates a tank which may be supplied with crude oil, or any of the lower grades of hydro-carbon, said tank being preferably elevated to induce a downward flow of the oil. From said tank a pipe 2 is adapted to convey the oil to a cylinder 3 containing a heating coil 4. It is obvious that the coil 4 may be a continuation of the pipe 2. Surrounding the cylinder 3 is a large cylinder 5, and it will be noted that between said cylinders is a dead air space 6.

7 indicates the exhaust pipe of the engine (not shown), said pipe 7 leads into the cylinder 3, and when the engine is running the exhaust gases serve to heat the coil 4 and the oil contained therein. The dead air space 6 retains the heat and is very advantageous in cases where the engine is allowed to remain idle temporarily.

Within the coil 4 the oil is vaporized by the heat and thereafter passes through a continuation of said coil into a pipe 8 which terminates within the tank 9 as shown in Fig. 1. Near the outside end of the pipe 8 is located an air intake pipe 10 provided with a valve 11 adapted to control the supply of air. The air enters the pipe 8 and intermingles with the oil vapor issuing from the continuation of the coil 4 and the combined mixture is thereby carried into the tank 9. A valve 12 located in the pipe 10, is adapted to cut off the supply of air to the pipe 8. The air and vapor are caused to pass from the bottom of the tank 9 through a filtering medium, comprising two conical, opposed, perforated disks. This filtering medium accomplishes two very important functions. It causes a more thorough intermingling of the air and oil vapor, as they pass through the interstices of the absorbent material, and also serves to remove any of the heavier unvolatilized particles held in suspension. Furthermore a proportion of the air within the filtering medium is absorbed by the mixture, and becomes intermingled therewith. After the mixture passes through the filter 13 it is a highly inflammable gas, practically free from unvolatilized ingredients.

The end 14 of the pipe 8 within the tank 9, is downwardly turned as shown in the drawing. The purpose of this construction is to allow the unvolatilized ingredients or heavy particles carried in suspension, to strike the interior face 14ª of the pipe, and drop to the bottom of the tank 9, thereafter to be carried off by the pipe 15. The volatile and lighter mixed vapor passes upwardly to the filter and strikes the lower conical disk 16, where other unvolatilized ingredients are removed. It is obvious that the passage of the mixture through the porous material in the body of the filter will remove still other unvolatilized ingredients and that the resultant vapor will be substantially free from unvolatilized ingredients and therefore in a condition to provide for maximum efficiency.

In the preferred form of my apparatus I employ a settling tank or chamber 9 which is very much larger in diameter than the diameter of the pipe 8, whereby a decrease in the velocity of the vapor takes place immediately upon the vapor passing from said pipe. This construction admits of the mixed air and oil vapor traveling through the pipe at a high speed until it strikes the downwardly turned face 14ª, where it is partially atomized. Immediately after the admixture enters into a relatively enlarged space, and hence, since it is impelled upwardly by the same force which carried it through the pipe 8, its velocity will be greatly reduced. It will be noted that the relatively low velocity allows the heavy ingredients to fall through gravity to the settling chamber, before they strike the lower perforated disk, but the lighter vapors will still be allowed to pass upwardly through the filtering medium, be further relieved of the particles held in suspension, and will reach the motor as a highly inflammable vapor.

Near the upper end of the tank 9 I provide a pipe 17 which leads to the manifold of the engine. Leading into this pipe 17 is an additional air inlet pipe 18, provided with a pressure valve and cut-off valve in a manner similar to the pipe 8. A supply pipe 19, having a cut-off valve 20, enters the upper portion of the tank 9, for a purpose hereinafter described. The top of the tank 9 is closed by a flexible circumferentially corrugated diaphragm 21, adapted to act as a safety cap in case of violent backfiring of the engine. In case of such backfire, the diaphragm, which is of relatively thin material, will be blown off and prevent injury to the filtering medium.

The filtering medium comprises two conical, perforated opposed disks 16, 16 embracing a plurality of fibrous strands. A screw-threaded rod 23 extends through the centers of these disks, the lower portion of said rod being supported by a spider 24. The upper portion 25 of said spider contains an interiorly screw-threaded aperture adapted to receive the rod 23. A handwheel 24ª is provided upon the top of the rod, whereby rotation may be imparted thereto and the filtering medium as a whole raised or lowered.

The filter 22 is made vertically adjustable so as to adapt it for use with the heaviest of the hydro-carbon oils. In the use of the very heavy oils, a larger percentage of unvolatilized ingredients are held in suspension in the tank 9 below the filter. In such cases the filter is moved upwardly the result being that the suction of the engine is not so liable to cause the heavier particles in suspension to strike against the lower disk 16 and fill the apertures. Nevertheless the ascent of the lighter particles will not be retarded. The suction power of engines varies in direct proportion to the diameter, bore and number of the cylinders, and the speed thereof. In engines having a high suction power the filter 22 is raised, the result being that a smaller quantity of the heavier suspended ingredients are allowed to reach the lower disk 16. In engines of lower suction power the filter may be moved downwardly since the heavy ingredients will not be drawn upwardly to as great an extent. The difference in suction power of various engines may be compensated for by varying the quantity of porous material between the cones, as will be readily understood. It will be observed that the prime object in the provision of a vertically adjustable filter is to prevent the filling of the apertures of the lower disk 16 and the interstices of the porous material.

If the heavier globules of oil, or unvolatilized ingredients, are allowed to strike the lower disk, they will eventually fill the apertures thereof, the result being that the lighter particles would either not pass therethrough, or that the heavier ingredients would be drawn up into the porous material. In the latter event the filtering medium would soon become saturated and soggy, and, under the aspirations of the motor, would allow the heavier ingredients to be drawn into the combustion chambers, thereby causing the motor to lose its maximum efficiency. By means of the vertically adjustable filter I am enabled to vary the distance of travel of the vapor from the bottom of the settling chamber to the lower disk, and hence minimize the chance of the heavier particles reaching said disk. It will therefore be understood that, by varying the height of the filter, I am enabled to insure an adjustment which will prevent the aspirations of the motor from lifting the heavier ingredients as far as the lower disk. It will be obvious that this adjustment will vary in accordance with the lifting power of the motor and the specific gravity of the particular oil being used, but it will also be understood that the filter may be set to meet any condition which may arise. By this construction I find that the lower portion of the filtering medium is kept barely moist, while the upper portion is practically dry. The inner end of the pipe 17 is provided with a screen 26, to prevent back-firing, in a manner which will be clearly manifest.

It is to be understood that the vapor is drawn through practically the entire system by the suction of the engine. The crude oil is conducted by any well-known means, preferably by gravity but assisted by suction, to the coil 4, where vaporization takes place and the vapor is drawn by the suction of the engine to the pipe 8. At this point it meets an incoming stream of air induced into the pipe 8, and an intermingling takes place. In a manner hereinbefore described the mixture is caused to pass upwardly through the filter and into the engine.

It will be observed that the extension 4ᵃ of the coil 4 within the pipe 8, terminates at a point beyond the entrance of the air intake 10. I have found that far better results are obtained by this construction. The incoming cold air induced by the suction of the engine strikes the pipe 4ᵃ, and is heated, expanded and rarefied, thereby adapting it to more readily absorb or commingle with the vapor issuing from the pipe 4ᵃ. After the engine has run a short length of time the pipe 8 becomes heated and assists in warming the air. It will also be noted that by this construction the cold air is prevented from striking the oil vapor at an angle. The air travels along within the pipe 8 and surrounding the pipe 4ᵃ, and at the same speed as the vapor in the pipe 4ᵃ. At the end of said pipe the rarefied air meets the vapor, both traveling at the same speed. It is obvious that, since the molecules of the air and vapor are traveling in the same direction and at the same speed they more readily cling or cohere, and that more thorough intermingling is effected.

After the unvolatilized ingredients have been removed by the wall 14ᵃ, the disks 16, 16, the absorbent material, 22, and by the action of gravity, in the chamber 9, if desired, I may admit a further supply of air by means of the pipe 18. In some cases I have found that an additional supply of air is effective in speeding up the motor and in a saving of fuel.

It is to be understood that the elevation of the tank 1 imparts pressure to the oil as it descends through the pipe 2, coil 4 and outlet 4ᵃ. Furthermore, as the oil is heated it expands and increases the pressure, so that, when the downward impulse is augmented by the suction of the engine, the oil vapor strikes the face 14ᵃ of the pipe with considerable speed. It is obvious that the heavier unvolatilized ingredients would impinge against the face 14ᵃ and drop downwardly, thereby tending to form a veil of unvolatilized ingredients. The volatile mixture passes through this veil thereby taking such partially unvolatilized molecules as would be provided by the breaking up action caused by the forcible contact of the ingredients issuing from the pipe 4ᵃ with the face 14ᵃ.

In order to initially start the engine after all the ports are thoroughly cooled I open the valve 20. The pipe 19 leads to a tank or receptacle containing gasolene or any light hydro-carbon. This light oil is allowed to run upon the surface of the filtering medium, commingles with the air therein, and, when the engine is cranked the gasolene vapor is drawn in the cylinders and ignited in the usual manner. After the engine runs until the exhausts heat the oil in the coil 4, the valve 20 may be closed and the engine will continue to run by the combination of the commingled air and crude oil vapor.

From the foregoing it will be readily understood that I first vaporize the crude oil by a heating process, thereafter intermingle the vapor with air and pass the resultant mixture at a reduced velocity and in an upward direction through a filtering medium. I may pass the vapor through the filter and then supply the air, or I may add the air before and after the filtration process takes place, and I believe that I am the first in the art to perform this process. To the best of my knowledge and belief, prior to my invention, the intermingling of crude oil vapor and air, and a separation of the heavier ingredients by gravity, and a subsequent filtration has never been successfully accomplished.

In the drawings I have shown one form of my apparatus but it is understood that I claim as my invention all such embodiments or modifications thereof as fall within the scope of the appended claims. It is obvious that the conduits 8 and 17 and the tank 9 might be an integral structure, or, in other words that the tank 9 might be merely an enlargement of the conduit 8. Also that, instead of the downwardly turned portion 14ª constituting the baffle element, I may place the element within the conduit 8, or anywhere within the path of high velocity of the admixture. Such modifications are clearly within the scope of my invention.

What I claim is:

1. An apparatus of the class described comprising means for causing an admixture of air and oil vapor, a conduit for conveying said mixture, a settling chamber carrying a filtering medium and communicating with said conduit, and means for varying the distance between said medium and the point of communication between said chamber and conduit.

2. An apparatus adapted for attachment to a gas engine of the class described comprising a conduit adapted to convey an admixture of air and oil vapor, at a relatively high velocity, an adjustable filtering medium in the path of said mixture, and means for reducing the velocity of said mixture before it reaches said medium.

3. An apparatus of the class described comprising a conduit adapted to convey an admixture of air and oil vapor, an enlarged chamber in the path of said mixture and communicating with said conduit, an adjustable filter in said chamber, and means for varying the distance between said filter and the point of communication between said conduit and said chamber.

4. An apparatus of the class described comprising a conduit, means for causing an admixture of air and oil to pass therethrough, means for partially atomizing said admixture, a relatively large chamber in communication with said conduit, a filter in said chamber, and means for varying the distance between said filter and the point of communication between said chamber and said conduit.

5. An apparatus of the class described comprising a conduit, means for causing an admixture of air and oil to pass therethrough, a baffle element in the path of said admixture, a relatively large chamber in communication with said conduit, a filter in said chamber, and means for varying the distance between said filter and the point of communication between said chamber and said conduit.

6. An apparatus adapted for attachment to a gas engine of the class described comprising a conduit adapted to convey an admixture of air and oil vapor, at a relatively high velocity through said conduit, an enlarged portion of said conduit, whereby the velocity of said admixture is reduced, a filtering medium in said portion, and means for varying the distance of said filter from the point of enlargement.

7. An apparatus of the class described comprising a restricted conduit, an enlargement thereof, an adjustable filter in said enlargement, and a baffle element between said filter and said restricted portion.

8. An apparatus of the class described comprising a conduit, adapted for attachment to a gas engine whereby a mixture of air and oil vapor may be caused to pass therethrough at a relatively high velocity, means for reducing the velocity of said mixture, and an adjustable filter in the conduit, beyond the point of reduction.

9. An apparatus of the class described comprising a conduit, adapted for attachment to a gas engine whereby a mixture of air and oil vapor may be caused to pass through said conduit at a relatively high velocity, a baffle element in the path of high velocity, means for reducing the velocity of said mixture, and an adjustable filter in the conduit, beyond the point of reduction.

10. An apparatus of the class described comprising means for mechanically vaporizing the oil under pressure, means for adding air to the vapor, a settling chamber, a conduit for conveying the admixture thereto, an adjustable filter in said chamber, and through which at least a portion of the admixture passes, and means for conducting the filtered vapors to the point of combustion.

11. An apparatus of the class described comprising means for vaporizing the oil, means for automatically adding air to the vapor, a settling chamber, a conduit for conveying the admixture thereto, an adjustable filter in said chamber, and through which at least a portion of the admixture passes, and means for conducting the filtered vapors to the point of combustion.

12. An apparatus of the class described comprising means for vaporizing the oil, means for adding air to the vapor, an adjustable filtering medium, means for conducting at least a portion of the admixture through said filtering medium, means for adding more air to the filtered vapor and means for conducting said vapor to the point of combustion.

13. An apparatus of the class described comprising a conduit, an elevated tank having a downwardly extending oil outlet pipe opening into said conduit, a sealed chamber surrounding a portion of said pipe, means for heating said chamber whereby the oil in the pipe is vaporized, means in the conduit for adding air to the vapor as it issues from the pipe, an enlarged portion of said conduit, an adjustable filtering medium in said enlarged portion, and means for causing the admixture to pass into said enlarged portion, and at least a part thereof through said filtering medium to the point of combustion.

14. An apparatus adapted for attachment to a gas engine comprising means for causing an admixture of air and oil vapor, a restricted conduit adapted to convey said admixture, a settling chamber, a filter in said chamber, and means for varying, proportionately to the speed and power of the engine motor, the distance of said filter from the point of entrance of said admixture into said chamber.

15. An apparatus of the class described comprising an elevated oil tank, a pipe leading therefrom, a container surrounding a portion of said pipe, a conduit into which said pipe enters, said conduit being provided with a downwardly turned portion constituting a baffle element, a chamber into which said conduit enters, and an adjustable filter in said chamber, substantially as described.

16. An apparatus of the class described comprising an elevated oil tank, a pipe leading therefrom, a container surrounding a portion of said pipe, a conduit into which said pipe empties, a valve entering into said pipe and automatically adding air under pressure, a baffle element in said conduit, an enlarged chamber into which said conduit leads, and an adjustable filter in said chamber.

17. An apparatus of the class described comprising a conduit adapted for attachment to a gas engine and to convey a mixture of air and oil vapor, a filtering chamber into which said conduit empties, and an adjustable filter above and a settling reservoir below the point of entrance of said conduit into said chamber.

In testimony whereof I affix my signature in presence of two witnesses.

CHARLES VIVION STUART.

Witnesses:
 NOMAN NATHANIEL THOMPSON,
 CHARLES LEA NEELY.